(12) United States Patent
Richard

(10) Patent No.: US 6,421,104 B1
(45) Date of Patent: Jul. 16, 2002

(54) FRONT ILLUMINATOR FOR A LIQUID CRYSTAL DISPLAY AND METHOD OF MAKING SAME

(75) Inventor: Fred Vincent Richard, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/426,169

(22) Filed: Oct. 22, 1999

(51) Int. Cl.[7] .......................... G02F 1/1335; F12V 7/09
(52) U.S. Cl. ............................. 349/63; 399/187; 362/31
(58) Field of Search .................. 349/63, 61, 9, 349/187; 362/51

(56) References Cited

U.S. PATENT DOCUMENTS

| | | | | |
|---|---|---|---|---|
| 6,020,944 A | * | 2/2000 | Hoshi ........................... | 349/62 |
| 6,048,071 A | * | 4/2000 | Sawayama .................... | 349/63 |
| 6,108,059 A | * | 8/2000 | Yang ............................. | 349/63 |
| 6,196,692 B1 | * | 3/2001 | Uemoto et al. ................ | 349/63 |

* cited by examiner

Primary Examiner—Toan Ton

(74) Attorney, Agent, or Firm—Rennie William Dover

(57) ABSTRACT

A front illumination device for illuminating a reflective liquid crystal display cell (42) having a light source (12), a light guide (20), and a light coupling element (22). The light guide (20) has a thin plate element configured to receive light along an edge surface (28) thereof at an angle such that a majority of the light is totally internally reflected from the front surface (24) of the light guide (20). The light coupling element (22) has a thin plate element having a front surface (30) that is in contact with the back surface (26) of planar light guide (20). The front surface (30) of the light coupling element (22) has a plurality of cavities (40) disposed therein. Light impinging the interfaces (27) between cavities (40) and the back surface (26) is totally internally reflected within light guide 20. Light impinging the interfaces (33) between the cavities is transmitted into light coupling element (22) and is allowed to impinge a pixel (48A–48K) of liquid crystal display cell (42) which selectively rotates the polarization according to the selected state of the pixel and reflects the light back through the front surface (24) of light guide (20) for viewing by the user. A method of manufacturing the light coupling element (22) includes depositing a mask on the <100> surface of a silicon substrate (612), preferentially etching the substrate (614) and applying metallization to the etched substrate (616) to form a mold master having an extremely fine intercavity pitch.

2 Claims, 3 Drawing Sheets

FRONT ILLUMINATOR FOR A LIQUID CRYSTAL DISPLAY AND METHOD OF MAKING SAME

FIELD OF THE INVENTION

The present invention is directed to liquid crystal display devices and more particularly, to a display system comprising an apparatus for providing front illumination to a reflective liquid crystal display.

BACKGROUND OF THE INVENTION

Liquid crystal displays (LCD's) are commonly used in portable computer systems, cellular telephones, pagers and other portable electronic devices in order to display information to the user. An LCD requires a source of light for operation because the LCD is effectively a light valve, selectively allowing transmission of light in one state and blocking transmission of light in a second state. LCD's can be generally broken down into two broad categories, reflective liquid crystal displays and transmissive liquid crystal displays. As the name implies, in a transmissive liquid crystal display, light, typically from a backlighting device, is selectively transmitted through the liquid crystal display for viewing by the user positioned on the side of the LCD opposite the backlight. A reflective liquid crystal display, on the other hand, receives light from the front surface and selectively reflects it back through the front surface of the LCD for viewing by the user. Reflective liquid crystal displays have advantages over transmissive liquid crystal displays primarily in that, except in very low light conditions, they can use ambient light rather than requiring a backlighting apparatus. Accordingly, portable devices using reflective liquid crystal displays have substantially lower power consumption than an equivalent device having a backlighted transmissive liquid crystal display.

A conventional method of providing artificial illumination for a reflective liquid crystal microdisplay, used in a virtual display, involves use of a polarizing beam splitting cube. Front illumination of a reflective liquid crystal display by means of a polarizing beam splitting cube, however, is difficult to implement in a compact portable device because the thickness of the polarizing beam splitting cube is typically at least as thick as the liquid crystal display is wide along its longest dimension. The relatively thick polarizing beam splitting cube also increases the complexity of the projection or viewing optics as these must, of necessity, have a retrofocus distance at least as great as the thickness of the polarizing beam splitting cube through which the projection or viewing optics must focus. Accordingly, front illumination of a liquid crystal cell by means of a polarizing beam splitting cube is impractical for most portable electronic devices. Accordingly, what is needed is a compact thin apparatus for providing front illumination for a reflective liquid crystal display.

BRIEF DESCRIPTION OF THE DRAWINGS

The invention will be better understood from a reading of the following detailed description, taken in conjunction with the drawings in which like references are used to identify like elements and in which.

DETAILED DESCRIPTION OF THE DRAWINGS

Figure 1:
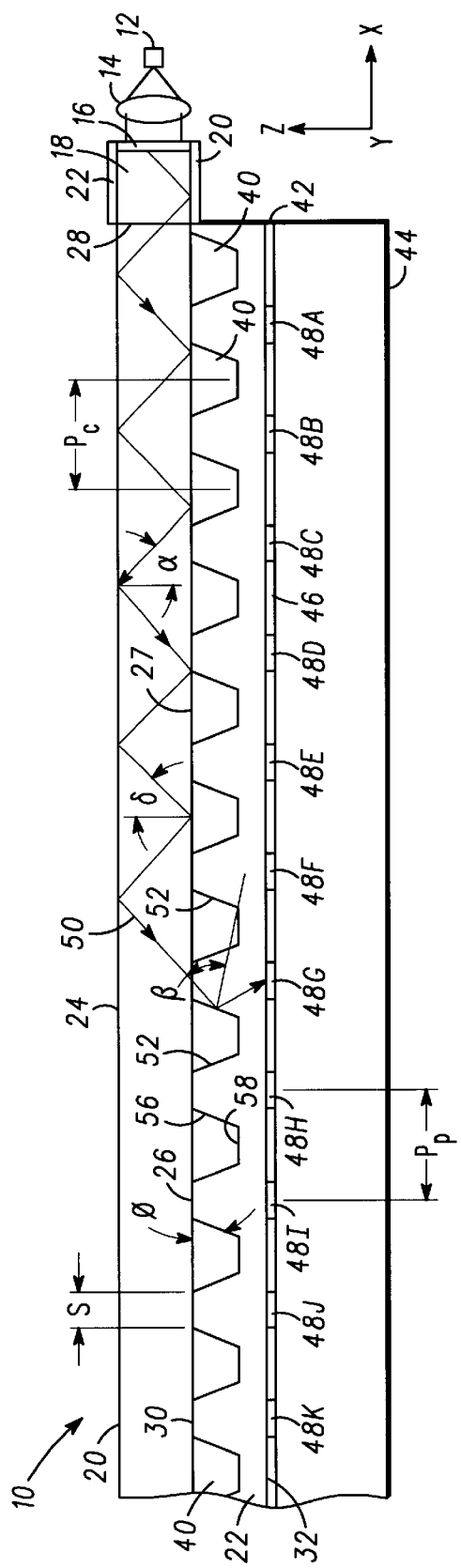
FIG. 1 is a side sectioned elevational view of a front illuminated liquid crystal display system incorporating features of the present invention.

FIG. 1 is a sectioned side elevational view of a front illuminated liquid crystal display system 10 comprising a light source 12, a collimating lens 14, a polarizing filter 16 and a light pipe 18. Light source 12 may be a conventional light emitting diode (LED), cold cathode lamp, or other conventional light source used for illuminating liquid crystal displays. Light pipe 18 is a conventional transparent light guide and may include reflective surfaces 20 and 22. Liquid crystal display system 10 further comprises a light guide 20 and a light coupling element 22. Light guide 20 comprises a thin plate composed of a transparent material such as polymethyl methacrylate (PMMA), polycarbonate, SOL-GEL, (a proprietary moldable glass manufactured by the GelTech Company) or any other moldable transparent material. The transparent material out of which light guide 20 is made has an index of refraction greater than 1, preferably in the range of about 1.4 to 1.6. In the illustrative embodiment of FIG. 1, light guide 20 is made from PMMA having an index of refraction of approximately 1.5. Light guide 20 comprises a front surface 24 and a rear surface 26, which comprise substantially flat parallel surfaces defining light guide 20. The term "substantially flat and planar" as used herein means that the surfaces are formed without any intentional lens or prismatic features that would distort the image transmitted through the light guide.

The index of refraction of the transparent material out of which light guide 20 is made defines a critical angle α with respect to front surface 24 such that a light ray passing from the interior of light guide 20 through front surface 24 at an angle less than α will pass through surface 24 but a light ray having an incident angle with respect to front surface 24 greater than alpha will be totally internally reflected within light guide 20. Light pipe 18 optically couples light source 12 to light guide 20. As used herein, the term "optically coupled" means that light is transmitted from one structure to another without regard to index matching. Collimating lens 14 and light pipe 18 are sized and configured such that the majority (i.e. at least 50%) of the light passing through the exit surface 28 of light pipe 18 into light guide 20 is totally internally reflected from front surface 24 of light guide 20.

Light coupling element 22 also comprises a generally planar front surface 30 and a generally planar rear surface 32. A plurality of depressions 40 are formed in surface 30 extending toward rear surface 32. Depressions 40 preferably comprise a two-dimensional array of frustro-pyramidal cavities arranged in a two-dimensional grid in the X and Y planes of FIG. 1. Preferably light coupling element 22 is made of a moldable material having an index of refraction equal to or greater than the index of refraction of light guide 20.

Liquid crystal display system 10 further comprises a liquid crystal cell 42 comprising a reflective liquid crystal display. Liquid crystal cell 42 may be of conventional construction having a glass front wall and a glass rear wall with a liquid crystal material injected therebetween or as shown in FIG. 1 may be composed of a silicon back plane 44 and a liquid crystal material 46 with the rear surface 32 of light coupling element 22 forming the front electrode surface of the liquid crystal cell. In the illustrative embodiment of FIG. 1, liquid crystal cell 42 comprises a dot matrix liquid crystal display having pixels, such as pixels 48A–48K having an interpixel pitch "$P_p$" measured center-to-center between each adjacent pixel, for example, pixels 48H and 48I of FIG. 1.

Each of cavities 40 is filled with a material having an index of refraction that is less than the index of refraction of light coupling element 22. Preferably, cavities 40 are filled with a gaseous material such as air (index of refraction equal to one). When cavities 40 are filled with air, the critical angle δ between back surface 26 of light guide 20 and any one of cavities 40 is equal to the critical angle α defined by the front surface 24 of light guide 20. In the illustrative embodiment, where the index of refraction of light guide 20 is equal to 1.5, the critical angles α and δ are equal to arcsin (1/1.5) which is approximately equal to 42 degrees. Therefore, a light ray impinging on the interface 27 between rear surface 26 and any of cavities 40 at an angle greater than 42 degrees is totally internally reflected and similarly, a light ray impinging on front surface 24 at an angle greater than 42 degrees is also totally internally reflected. Where, however, a light ray impinges on the interface 33 between the rear surface 26 of light guide 20 and front surface 30 of light coupling element 22 between cavities 40, the ray is not reflected, but passes into the interior of light coupling element 22 as shown by the illustrative light ray 50 of FIG. 1.

Light entering the interior of light coupling element 22 after being totally internally reflected within light guide 20 impinges a side wall 52 of one of cavities 40. The side walls 52 of cavities 40 are formed at an inclined angle φ with respect to front surface 30. The angle φ is selected such that light passing into the interior volume of light coupling element 22 will impinge side wall 52 at an angle less than the critical angle β with respect to surface 52 such that the light will be totally internally reflected within light coupling element 22. Light so reflected, such as light ray 50 shown in FIG. 1 will impinge a pixel, such as pixel 48G of FIG. 1 of liquid crystal cell 42 and, depending upon whether pixel 48G is in the selected dark or selected light state, light ray 50 will be reflected back toward front surface 24 of light guide 20 with an angle of incidence less than the critical angle α and therefore the light reflected from pixel 54 will pass through front surface 24 of light guide 20. The interior surface 56 of side walls 52 and bottom wall 58 of cavities 40 may be provided with a reflective coating such that ambient light impinging cavities directly will be reflected back through front surface 24 of light guide 20, thereby giving cavities 40 a light appearance. A dark selected pixel 48 thus will be contrasted against the light background of the reflectively coated cavities 40 and the pixels 48 that are in the selected light state. Moreover, where the intersurfaces of cavities 40 are silvered, a light ray entering the interior of light coupling element 22 will be reflected by side walls 52 of cavities 40 irrespective of whether the light ray impinges sidewalls 52 at greater or less than the critical angle β. Alternatively, where a dark background is desired the interior surfaces 56 may be blackened to provide a dark contrast for select light pixels 48A–48U. It should also be observed that the additional area immediately beneath cavities 40 may also be utilized for location of semiconductor elements for controlling an active matrix liquid crystal cell 42.

As can be seen from FIG. 1, the intercavity pitch "$P_c$" between adjacent cavities is equal to the interpixel pitch "$P_p$" with the cavities 40 aligned such that the spaces "S" between cavities 40 are aligned over each of pixels 48A–48U such that the light rays passing between the cavities 40 impinge pixels 48 as described hereinbefore. The interpixel pitch "$P_p$" and hence the intercavity pitch "$P_c$" is typically from about 10 to 15 microns for virtual displays and up to 150 microns for direct view displays, however, the present invention is not limited to any particular interpixel pitch and indeed may be used for other than dot matrix displays, such as seven segment displays or customized displays provided the display is configurable such that a sufficient number of cavities and adjacent spaces are available to direct the light to impinge the selectable pixels of the display as described hereinbefore.

Figure 2:
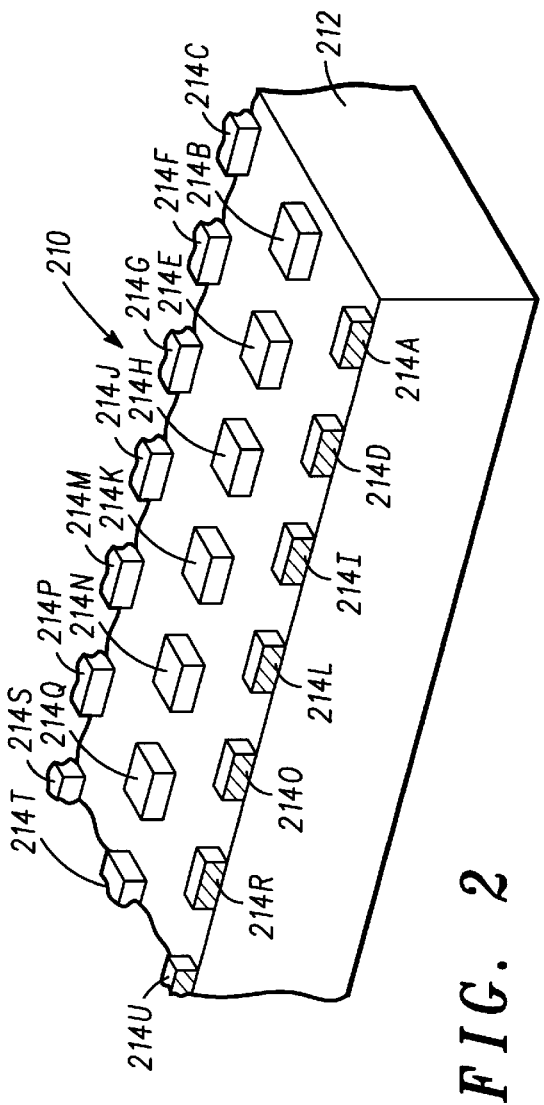
FIG. 2 is a sectioned perspective view of a masked wafer illustrating a process step for forming a light coupling element in accordance with the present invention.

The formation of a two-dimensional array of frusto-pyramidal depressions having an intercavity pitch of less than 15 microns presents substantial challenges for conventional micromachining manufacturing techniques. Accordingly, silicon preferential etching techniques may be advantageously adapted to the manufacture of light coupling element 22. With reference to FIG. 2, a positive image 410 of light coupling element 22 suitable for manufacture of a mold master (see FIG. 5) may be made by applying a mask 210 comprising a pattern of islands 214A–214U on the <100> surface of a monocrystal silicon substrate 212. Mask 210 may comprise conventional photoresist, oxide, or other mask material capable of withstanding the preferential etch process described hereinafter.

Figure 3:
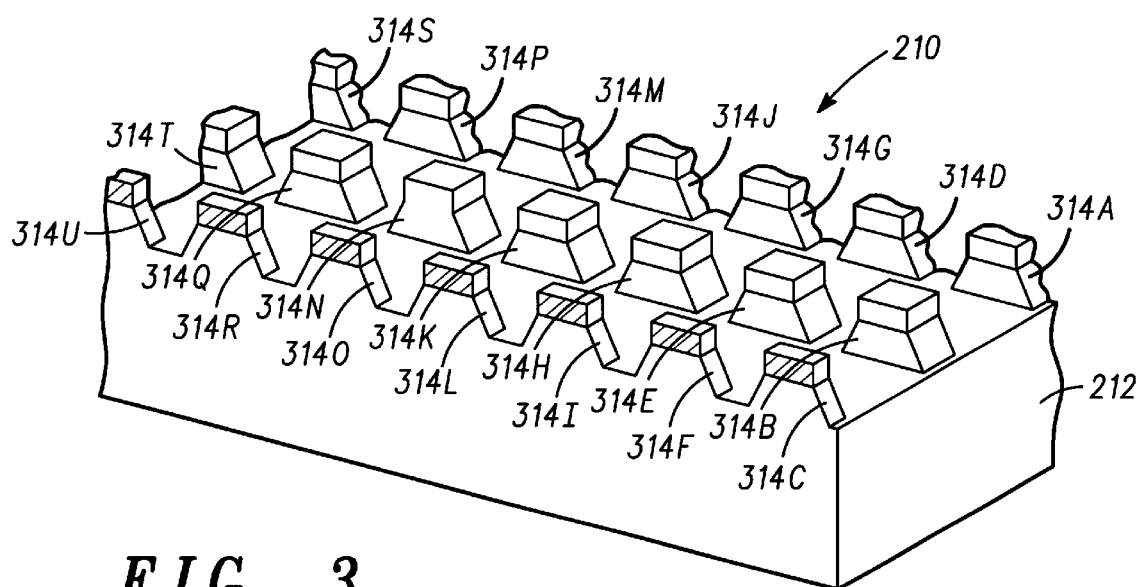
FIG. 3 is a sectioned perspective view of an etched wafer illustrating a process step in forming a light coupling element in accordance with the present invention.

With reference to FIG. 3, the substrate 212 with mask 210 attached is subjected to a conventional preferential etching process that preferentially removes material to expose the <111>faces of substrate 212. The preferential etching process yields a pattern of frusto-pyramidal structures 314A–314U immediately beneath mask 210. The frusto-pyramidal structures have walls inclined at an angle of 54 degrees relative to the upper surface of the substrate 212 as dictated by the crystal structure of substrate 212 itself. Mask 210 is then stripped from substrate 212 to reveal the frusto-pyramidal structures 314A–314U.

Figure 4:
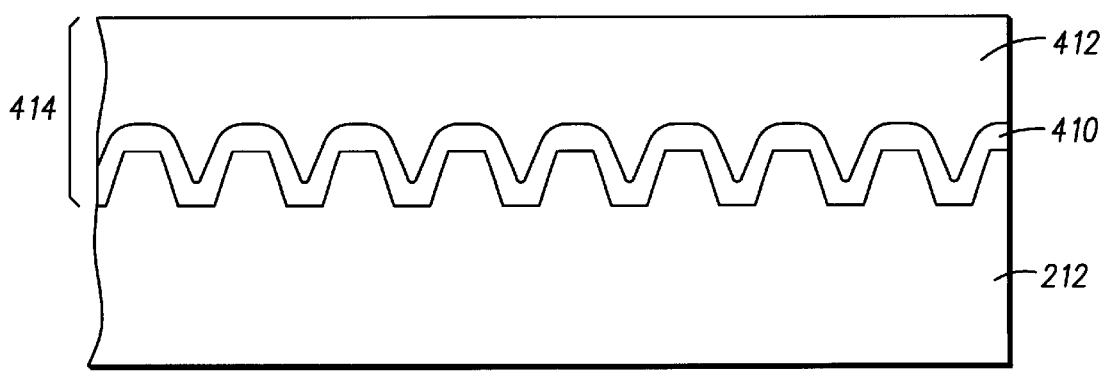
FIG. 4 is a sectioned elevational view of a metalized wafer illustrating a process step in forming a light coupling element in accordance with the present invention.
Figure 5:
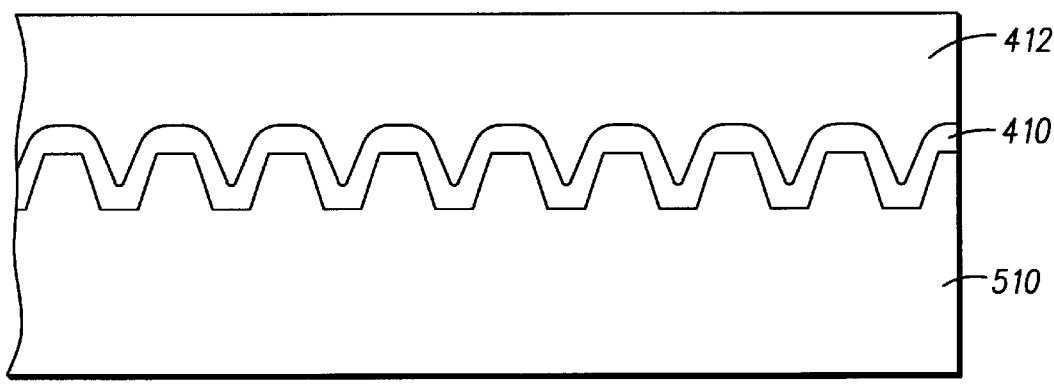
FIG. 5 is a sectioned elevational view of a mold master illustrating a process step in forming a light coupling element in accordance with the present invention.

As shown in FIG. 4, once mask 210 has been stripped from substrate 212, a metalization layer 410 is applied to substrate 212. Metalization layer 410 may comprise conventional metalization layers such as gold or aluminum applied by conventional chemical vapor deposition or physical vapor deposition techniques well known in the art followed by a nickel electroformed metalization layer also well known in the art. Thereafter, an additional reinforcing layer of metalization 412 or other conventional material may be added to layer 410 to provide a rigid self-supporting structure. As shown in FIG. 5, once self supporting structure 414 is formed, substrate 212 is etched away leaving a positive image of light coupling element 22 formed by the exposed surface of metalization layer 410. A mold master 510 may then be created by conventional techniques to produce an insert suitable for use in a conventional injection molding machine capable of handling polycarbonate, PNMA, SOL-GEL or other transparent materials suitable for use as a light coupling element 22.

Figure 6:
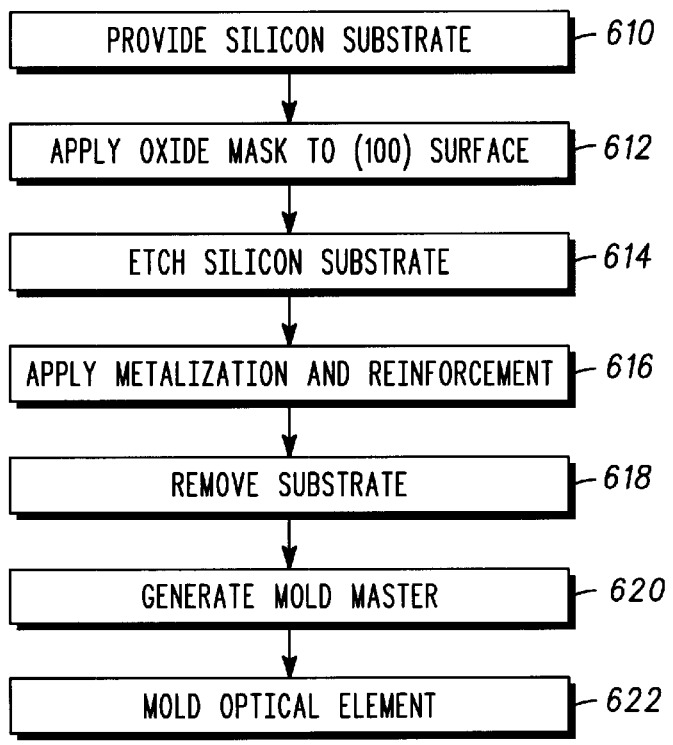
FIG. 6 is a flow chart of process steps in forming a light coupling element in accordance with the present invention.

The foregoing process steps are summarized in the flow chart of FIG. 6. As shown in FIG. 6, the method of producing the optical element comprises the steps of providing a silicon substrate 610, applying an oxide mask to the <100>surface of the silicon substrate 612, preferentially etching the silicon substrate to produce a plurality of features having the characteristic 54 degree angled side walls

614. Thereafter a metalization layer is applied to the etched silicon substrate as well as a thicker metalization layer for reinforcement 616. Thereafter the substrate is etched away 618 and the remaining reinforced metalization used to generate a mold master 620 from which the optical element is molded 622.

Although certain preferred embodiments and methods have been disclosed herein, it will be apparent from the foregoing disclosure to those skilled in the art that variations and modifications of such embodiments and methods may be made without departing from the spirit and scope of the invention. For example, in lieu of providing a mask 210 comprising a pattern of islands, a mask comprising a solid surface with a plurality of rectangular (square) apertures may be provided to directly produce a metallic mold master from which light coupling element could be molded. Accordingly, it is intended that the invention shall be limited only to the extent required by the appended claims and the rules and principles of applicable law.

What is claimed is:

1. A method of providing front illumination to a reflective liquid crystal light valve comprising a two dimensional dot matrix array of pixels having a front and a rear surface, the method comprising:

receiving polarized light from a light source along an edge of a light guide comprising a transparent plate having a front and a rear surface, the light guide being positioned in front of the front surface the reflective liquid crystal display;

totally internally reflecting a majority of the light from the light source in the light guide such that the majority of the light moves transversely through the light guide;

selectively reflecting a first portion of the majority of light from the light source through the bottom surface of the light guide proximal the pixels of the liquid crystal light valve such that the first portion passes through the front surface of the liquid crystal light valve to impinge the pixels of the liquid crystal light valve and wherein the step of selectively reflecting a first portion of the majority of light is effected by means of a two dimensional array of hollow cavities formed in said light guide;

selectively altering the polarization state of the first portion by means of the liquid crystal light valve;

reflecting the first portion back through the front surface of the liquid crystal light valve and through the back surface of the light guide; and transmitting the first portion through the light guide to exit the front surface of the light guide.

2. A method of providing front illumination to a reflective liquid crystal light valve comprising a two dimensional dot matrix array of pixels having a front and a rear surface, the method comprising:

receiving polarized light from a light source along an edge of a light guide comprising a transparent plate having a front and a rear surface, the light guide being positioned in front of the front surface the reflective liquid crystal display;

totally internally reflecting a majority of the light from the light source in the light guide such that the majority of the light moves transversely through the light guide;

selectively reflecting a first portion of the majority of light from the light source through the bottom surface of the light guide proximal the pixels of the liquid crystal light valve such that the first portion passes through the front surface of the liquid crystal light valve to impinge the pixels of the liquid crystal light valve and wherein the step of selectively reflecting a first portion of the majority of light is effected by means of a two dimensional array of hollow cavities spaced apart at a pitch of from 10 to 150 microns formed in said light guide;

selectively altering the polarization state of the first portion by means of the liquid crystal light valve;

reflecting the first portion back through the front surface of the liquid crystal light valve and through the back surface of the light guide; and transmitting the first portion through the light guide to exit the front surface of the light guide.

* * * * *